United States Patent [19]

Ishibashi et al.

[11] Patent Number: 5,088,080
[45] Date of Patent: Feb. 11, 1992

[54] APPARATUS FOR DERIVING SYNCHRONIZING SIGNAL FROM PRE-FORMED MARKS ON RECORD CARRIER

[75] Inventors: Hiromichi Ishibashi, Minou; Shinichi Tanaka, Kyoto, both of Japan

[73] Assignee: Matsushita Electric Industrial Co., Ltd., Osaka, Japan

[21] Appl. No.: 556,257

[22] Filed: Jul. 19, 1990

[30] Foreign Application Priority Data

Jul. 19, 1989 [JP] Japan ................................ 1-186434

[51] Int. Cl.⁵ .............................................. G11B 7/00
[52] U.S. Cl. ................................. 369/44.26; 369/48; 369/59; 369/58
[58] Field of Search ............... 369/44.26, 54, 42, 48, 369/58, 59, 32, 44.25, 44.35, 124, 275.1, 275.3, 275.4; 358/428; 360/39, 41, 51

[56] References Cited

U.S. PATENT DOCUMENTS

| | | | |
|---|---|---|---|
| 4,051,527 | 9/1977 | Bratt . | |
| 4,057,844 | 11/1977 | Smedley . | |
| 4,366,564 | 12/1982 | de Haan et al. | 369/48 |
| 4,562,564 | 12/1985 | Bricot et al. . | |
| 4,566,091 | 1/1986 | Gerard et al. | 369/48 |
| 4,566,092 | 1/1986 | Gerard et al. . | |
| 4,646,279 | 2/1987 | Yonezawa | 369/44.26 |
| 4,688,205 | 8/1987 | Abiko | 369/59 |
| 4,704,711 | 11/1987 | Gerard et al. | 368/59 |

Primary Examiner—Roy N. Envall, Jr.
Assistant Examiner—Thang V. Tran
Attorney, Agent, or Firm—Wenderoth, Lind & Ponack

[57] ABSTRACT

Pairs of synchronizing marks are formed on a record carrier periodically. At least one of the marks in every pair is located away from a track center line on which information data are to be recorded. Those marks are recovered by a reading head and fed to a phase lock loop in order to minimize phase error of synchronization. The phase lock loop produces a pair of synchronizing signals so as to derive a phase error signal from either of the marks. Therefore, continual phase error signal for the phase lock operation is obtained even when the reading head locates away from the track center line. Accordingly, stability of the synchronization will be improved.

9 Claims, 10 Drawing Sheets ic signal from synchronizing marks pre-formed on an optical or magnetic record carrier and an apparatus for deriving a tracking error signal synchronously from continually formed tracking marks on the record carrier.

APPARATUS FOR DERIVING SYNCHRONIZING SIGNAL FROM PRE-FORMED MARKS ON RECORD CARRIER

BACKGROUND OF THE INVENTION

1. Field of the Invention

This invention relates to an apparatus for deriving a synchronizing signal from synchronizing marks pre-formed on an optical or magnetic record carrier and an apparatus for deriving a tracking error signal synchronously from continually formed tracking marks on the record carrier.

2. Description of the Prior Art

A typical apparatus for deriving a synchronizing signal from pre-formed marks is disclosed in U.S. Pat. No. 4,051,527, issued Sept. 27, 1977. The marks are pre-formed periodically along a circular or spiral track on the record carrier, which is formed in a circular disk. From the record carrier in rotation, the marks are reproduced to be a read-out signal by a reading head repeatedly. The read-out signal is then fed to a phase-lock-loop (PLL) composed of a phase comparator, a voltage controlled oscillator (VCO), a count-decoder and a loop filter. The read-out signal is compared with a reference signal in phase by the phase comparator. The phase comparator converts phase difference between the read-out signal and the reference signal to a voltage signal, i.e. a phase error signal. The phase error signal, smoothed by the loop filter, is fed to the voltage controlled oscillator which produces a clock signal, the frequency of which is controlled by the input phase error signal. The count-decoder then produces the reference signal by counting rising edges of the clock signal and yields a pulse in every fixed number of counting.

The clock signal produced in the phase-lock-loop is employed for various functions of a data recording/reproducing system. For example, information data are recorded or reproduced in synchronization with the clock signal.

In the above-described apparatus, however, the phase-lock-loop easily loses the synchronization when the reading head moves outside of the information track. In the prior art, the synchronizing mark is formed along the center-line of the track. When the reading head moves away from the track, e.g. in track jumping operation, the synchronizing mark is not reproduced in enough amplitude. If the amplitude of the read-out signal is too small, a valid phase comparing is no more expected. In that case, the false phase error signal is fed to the phase-lock-loop as a disturbance, which will break the synchronization if lasting in a long period.

SUMMARY OF THE INVENTION

Accordingly it is an object of this invention to provide an apparatus for realizing a stable synchronization even when the reading head is located away from a track center line.

According to the present invention, to achieve the above object, a pair of synchronizing marks, at least one of which is not formed on the track center line, are formed on the record carrier. A pair of phase comparators produce phase error signals from read-out signals caused by the pair of the synchronizing marks, by comparing the phase of the read-out signals with phase of a pair of reference signals respectively. A loop selection circuit transmits one of the phase error signals to a phase-lock-loop.

In an embodiment of the invention, one of the synchronizing marks, a first mark, is formed on the center-line of a track and the other, a second mark, in the gap between adjacent two tracks. A read-out signal caused by the first mark is compared in phase with a first reference signal by a first phase comparator and a read-out signal caused by the second mark is compared in phase with a second reference signal by a second phase comparator. One of the outputs of the first and second phase comparators is selected according to the amplitude of the respective read-out signals and is fed to a phase-lock-loop equipped with a loop filter, a voltage controlled oscillator and a count-decoder. The count-decoder produces the first and second reference signals.

Another embodiment of the invention is characterized in that both of the synchronizing marks are formed out of the track center line at opposite sides to each other.

Still another embodiment of the invention is characterized in that a mark for tracking detection is formed on the track center line of the record carrier and in that the count-decoder produces a signal for sampling a tracking error signal.

Still another embodiment of the invention is characterized in that the tracking error signal is derived from the timing difference of outputs of elements which make a photo sensor for reading the marks on the record carrier.

DESCRIPTION OF THE PREFERRED EMBODIMENTS

Figure 1:
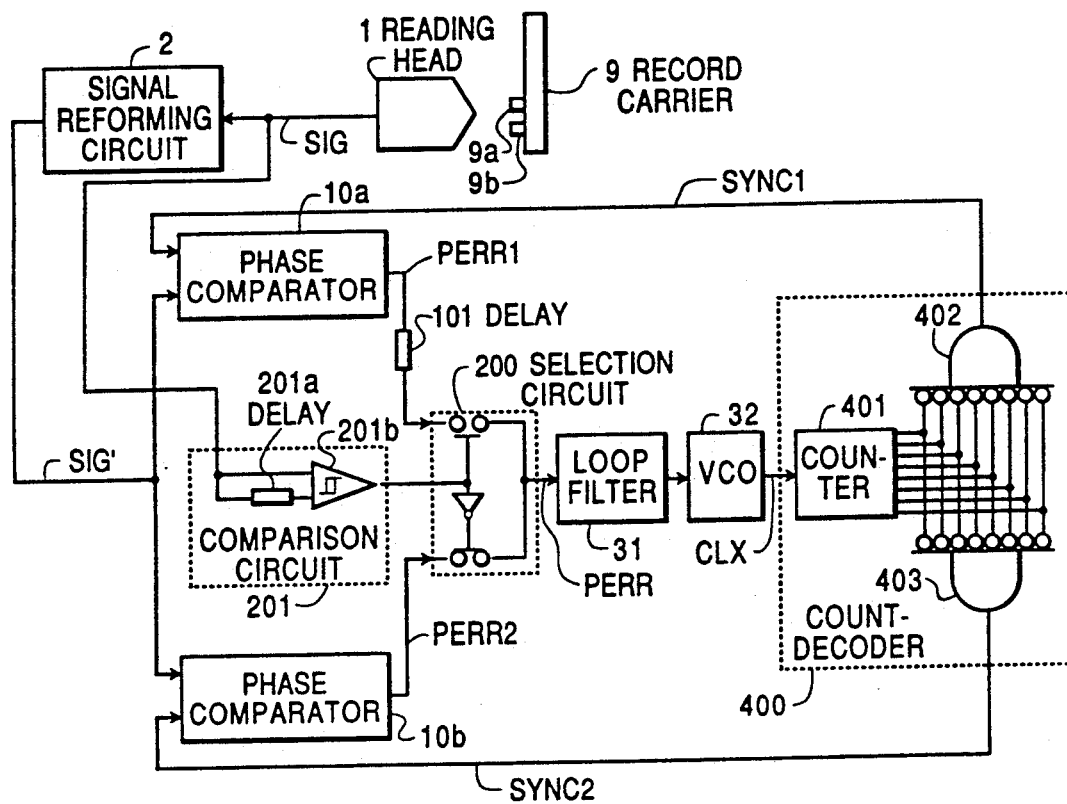
FIG. 1 is a block diagram showing a first embodiment of the invention.
Figure 2:
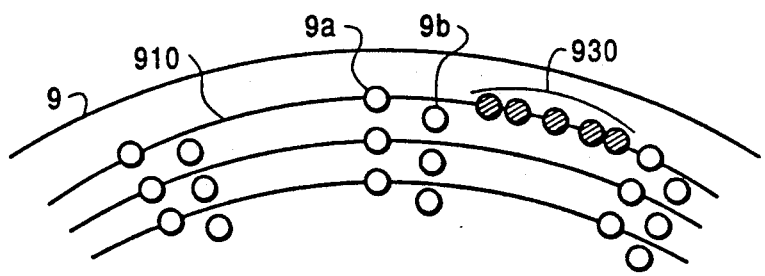
FIG. 2 is a partial view of the record carrier in FIG. 1.

FIG. 1 shows a synchronizing signal generating system as an embodiment of the present invention. FIG. 2 shows a partial view of the record carrier 9 on which pairs of synchronizing marks, each pair of which is composed of a synchronizing mark 9a and a synchronizing mark 9b, have been pre-formed along the recording tracks. In FIG. 1, a reading head 1 reads the synchronizing mark 9a and 9b, and outputs read-out signals "SIG-a" and "SIG-b" respectively, which are fed to a signal reforming circuit 2 and a comparison circuit 201. In order to simplify explanations from now on, the pair of the read-out signals "SIG-a" and "SIG-b" will be often called a read-out signal "SIG". The read-out signal "SIG" fed to the signal reforming circuit 2 is re-shaped to a two-level (high or low) signal "SIG'", made of signals "SIG'-a" and "SIG'-b", so as to be fed to phase comparators 10a and 10b. Thereafter, the phase comparator 10a measures the phase error between the reformed read-out signal "SIG'-a" and a synchronized signal "SYNC1" and outputs a phase error signal "PERR1". Similarly, the phase comparator 10b outputs a phase error signal "PERR2" which is in proportion to the phase error between the reproduced signal "SIG'-b" and a synchronized signal "SYNC2". The phase error signal "PERR1" is delayed by a delay line 101. The comparison circuit 201 compares the read-out signal "SIG-a" caused by the synchronizing mark 9a with the read-out signal "SIG-b" caused by the synchronizing mark 9b in amplitude and outputs a control signal "SEL". When the read-out signal "SIG-a" is larger than the signal "SIG-b", the comparison circuit 201 outputs "H"(high) and in the opposite case, "L"(low). A loop selection circuit 200, then, transmits one of the outputs of the phase comparators 10a and 10b in response to the control signal "SEL". Accordingly, either of the phase error signal "PERR1" or "PERR2" is fed to a loop filter 31 and then to a voltage controlled oscillator (VCO) 32. The VCO 32 generates a clock signal "CLK" whose frequency varies as a function of the filtered phase error signal. A count-decoder 400 generates the synchronizing signals "SYNC1" and "SYNC2" from the clock signal "CLK" and feeds them back to the phase comparators 10a and 10b, respectively. Response speed of the feed-back loop is determined by the loop filter 31.

In order to better understand the invention, detail constitutions and functions of the above-described structural elements will be described. In FIG. 2, the synchronizing marks 9a and 9b are formed along the concentric peripheral tracks formed on the disk-shaped record carrier 9. Those synchronizing marks are located at constant angular intervals. Furthermore, the synchronizing mark 9a is disposed center-line 910 of each track and the synchronizing mark 9b in a gap between two adjacent tracks. An information signal is recorded along the track center-line as recorded marks 930.

Figure 3:
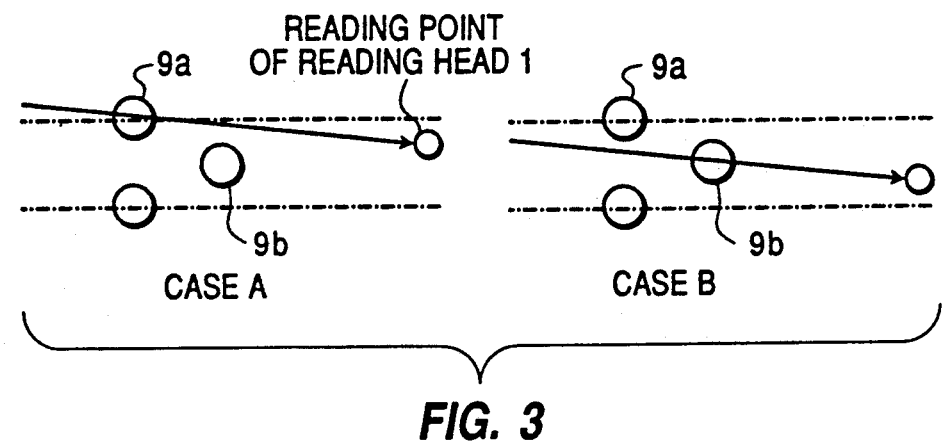
FIG. 3 is a diagram for explaining the invention.

FIG. 3 represents a partial view of the record carrier 9 and a trajectory of a reading point of the reading head 1, which moves across the tracks. When the reading head 1 accidentally scans about the center of the track (case A in FIG. 3), it reads the synchronizing mark 9a in enough amplitude. When the reading head 1 locates in a track gap (case B in FIG. 3), it reads the synchronizing mark 9b in enough amplitude. Consequently, since the reading head can read either the synchronizing mark 9a or 9b in enough amplitude, the stable synchronization free from failure of synchronizing mark detection is possible whether or not the reading head 1 is on the track (i.e., substantially on the track center-line).

Figure 4:
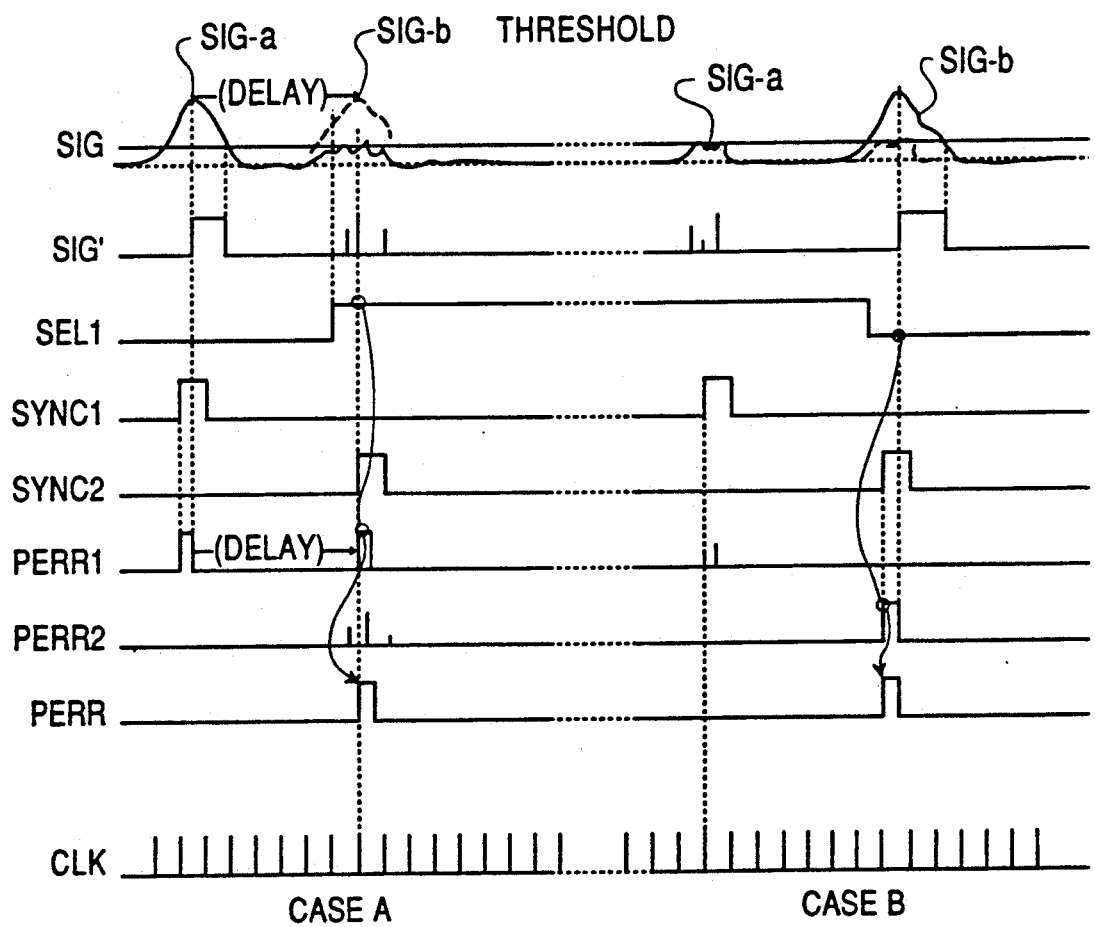
FIG. 4 is a timing chart of the block diagram shown in FIG. 1.

FIG. 4 shows a timing chart of the signals at the outputs of the structural elements illustrated in FIG. 1. In FIG. 4, there is illustrated the read-out signal "SIG", or read-out signals "SIG-a" and "SIG-b", recovered by the reading head 1 in correspondence to the "case A" and the "case B" in FIG. 3. The read-out signal "SIG" is reformed by the signal reforming circuit 2 to the two-level signal "SIG'" for phase comparison. The signal "SIG'" rises in response to a peak of the read-out signal "SIG" and then is reset in response to the threshold crossing of the read-out signal "SIG". In this embodiment, the rising edge is employed for the phase comparison. The phase comparators 10a and 10b output pulse signals each having a pulse width which is modulated by the phase error between the rising edge of the signal "SIG'" and the synchronizing signal "SYNC1" or "SYNC2".

The synchronizing signals "SYNC1" and "SYNC2" are prepared for the phase comparators of the read-out signals "SIG-a" and "SIG-b", respectively. In the case of "A" in FIG. 3—i.e. when the reading head 1 being on the track, a valid signal "SIG'-a" is reformed from the read-out signal "SIG-a" caused by the synchronizing mark 9a. Therefore, a valid phase error signal "PERR1" is obtained from the read-out signal "SIG-a" and the synchronizing signal "SYNC1". When the reading head is in the gap—case "B" in FIG. 3—and cannot read the synchronizing mark 9a in enough amplitude, the valid phase error signal is no more guaranteed. But instead of the read-out signal "SIG-a" and the synchronizing signal "SYNC1", the read-out signal "SIG-b" by the mark 9b and the synchronizing signal "SYNC2" offer a valid phase error signal "PERR2".

The loop selection circuit 200 picks out a valid phase error signal "PERR" from the phase error signals "PERR1" and "PERR2" in reference to the control signal "SEL" fed by the comparison circuit 201. The comparison circuit 201 comprises a delay line 201a and a differential comparator 201b. The read-out signal "SIG-a" passed through the delay line 201a and the read-out signal "SIG-b" are fed to the differential comparator 201b simultaneously. The differential comparator 201b, then, outputs "H" when the read-out signal "SIG-a" is larger than the read-out signal "SIG-b", or outputs "L" when the read-out signal "SIG-a" is smaller than the read-out signal "SIG-b". In addition, the differential comparator 201b has hysterisis so as to avoid noise-triggered illegal function. The "H" or "L" signal is fed to the loop selection circuit 200 as the control signal "SEL". The loop selection circuit 200 operates selective switching in response to the control signal "SEL".

There also exists the delay line 101 between the phase comparator 10a and the loop selection circuit 200 so that the phase error signals "PERR1" and "PERR2" are fed simultaneously to the loop selection circuit 200. The loop selection circuit 200, when receiving "SEL"="H" from the comparison circuit 201, i.e. the read-out signal "SIG-a" is larger than the read-out signal "SIG-b", transmits the phase difference signal "PERR1" as the phase error signal "PERR", and when "L", transmits the phase difference signal "PERR2" as the phase error signal "PERR".

Figure 5:
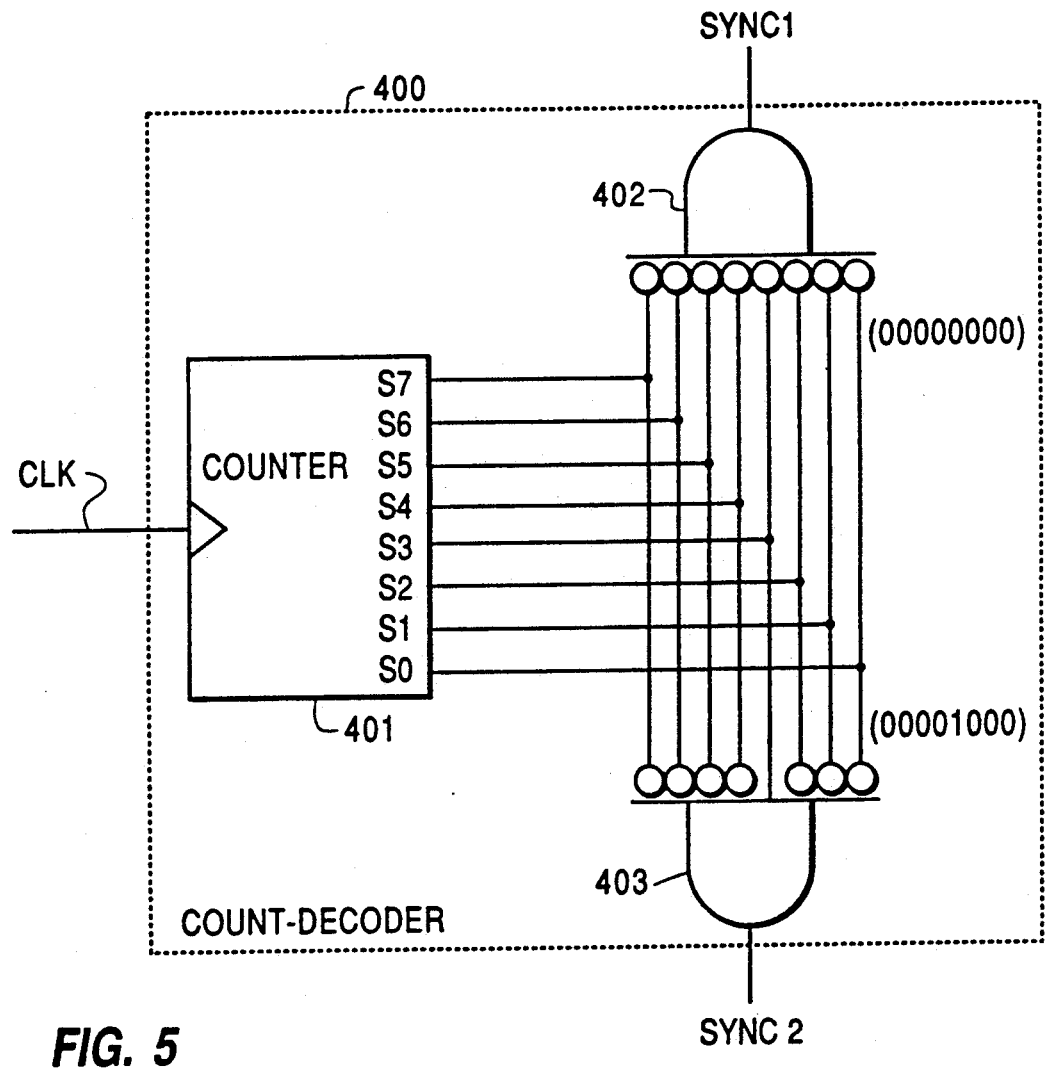
FIG. 5 is a block diagram of the count-decoder in FIG. 1.

The phase error signal "PERR" is fed to the loop filter 31 for being smoothed and then fed to the VCO 32. The VCO 32 generates the clock signal "CLK" whose frequency is controlled by the phase error signal "PERR". The clock signal is fed to the count-decoder 400. A detail diagram of the count-decoder 400 is shown in FIG. 5. The count-decoder 400 comprises a counter 401 and decoders 402 and 403. The output $s_7s_6s_5s_4s_3s_2s_1s_0$ of the counter 401 increases from 00000000 to 11111111 with the increment of 1 in response to each rising edge of the clock signal "CLK".

Thereafter the output is reset to 00000000. The decoder 402 outputs "H" when receiving 00000000 and the decoder 403 outputs "H" when receiving 00001000. In the other cases the outputs of the decoders 402, 403 remain "L".

The output of the decoder 402 is the synchronizing signal "SYNC1" and the output of the decoder 403 the synchronizing signal "SYNC2". Those are fed-back to the phase comparators 10a and 10b. The period of the counter—from 00000000 to 11111111—corresponds to the period of the synchronizing marks on the record carrier, and the period of clock counts from 00000000 to 00001000 corresponds to the bit-distance between the synchronizing mark 9a and the synchronizing mark 9b.

Accordingly, as described above, the phase difference signal "PERR1" derived from the read-out synchronizing mark 9a and the synchronizing signal "SYNC1" is fed to the PLL in the case that the reading head 1 scans about the track and reads the synchronizing mark 9a in enough amplitude. In the other case, the phase difference signal "PERR2" derived from the synchronizing mark 9b and the read-out signal "SYNC2" is fed to the loop. Consequently, the synchronization is carried out without any problem whether or not the reading head 1 is on the track.

Figure 6:
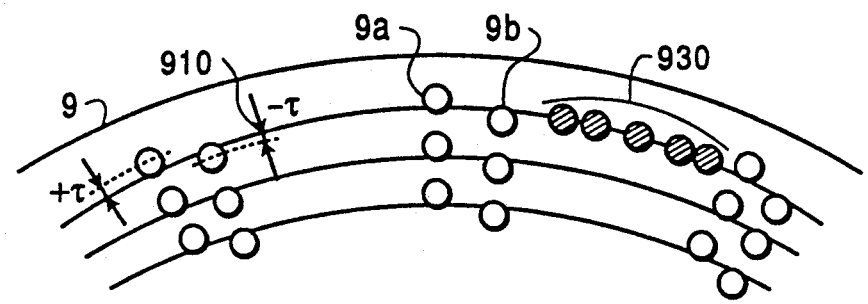
FIG. 6 is a partial view of a record carrier in a second embodiment of the invention.

A second embodiment of the present invention will now be described. In this embodiment, a record carrier disclosed in the U.S. Pat. No. 4,562,564 is employed. There formed pairs of wobble marks 9a, 9b as shown in FIG. 6 on the record carrier 9, which are used in the prior art for deriving a tracking error signal. In this embodiment, however, they play the same role as the synchronizing marks 9a and 9b described above. As shown in FIG. 6, those marks are disposed respectively $\pm \tau$ away from a track center line 910. Information data 930 are recorded along the track center line 910. In this embodiment, like the first embodiment, the read-out signals "SIG-a" and "SIG-b" are reproduced from the marks 9a and 9b respectively. In the case that the reading head 1 accidentally scans a line $+\tau$ away from the track center line, the synchronizing mark 9a is read out in the maximum amplitude, and in the case that the laser beam scans a line $-\tau$ away from the track center line, the synchronizing mark 9b is read out in the maximum amplitude. When the laser beam scans just on the track center line 910, both marks are read in the same amplitude. Since the laser beam scans neither the center of the sychronizing mark 9a nor the synchronizing mark 9b, the amplitudes of the read-out signals are smaller than the maximum amplitude. However, the synchronizing marks 9a and 9b are read in enough S/N if the above described "$\tau$"—distance between the center of the synchronizing mark 9a or 9b and the track center line—is within a half wave length. Similarly, even when the laser beam scans in the gap between two adjacent tracks, both synchronizing marks are recovered in enough amplitudes.

The arrangement shown in FIG. 6 contributes to the more stable synchronization than that shown in FIG. 2. In FIG. 2, only the synchronizing mark 9a, formed on the track center line, is read when the laser beam is just on the track and carrying out read/write operation. In that case, if the synchronizing mark 9a is missing, the read-out signal cannot be derived, which will cause malfunction of the phase feedback loop. It often happens that some marks fail to be formed in manufacturing process. In this embodiment, however, a single-mark drop-out would not disturb the synchronizing operation. Even if the synchronizing mark 9a fails to be detected in read-out procedure, the read-out signal can be gotten from the synchronizing mark 9b and vise versa. It is true that the signal is no more recovered if both the synchronizing mark 9a and 9b are dropped, but probability of double-mark drop-out is far smaller than that of the single-mark drop-out.

Figure 8:
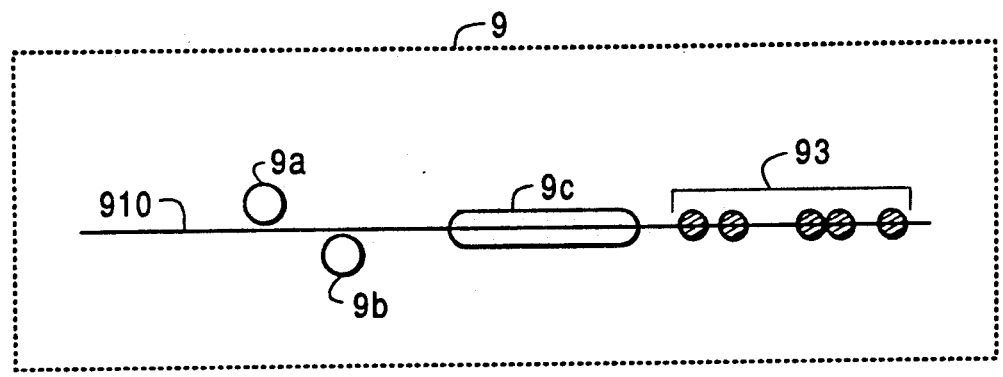
FIG. 8 is a partial view of the record carrier in FIG. 7.
Figure 7:
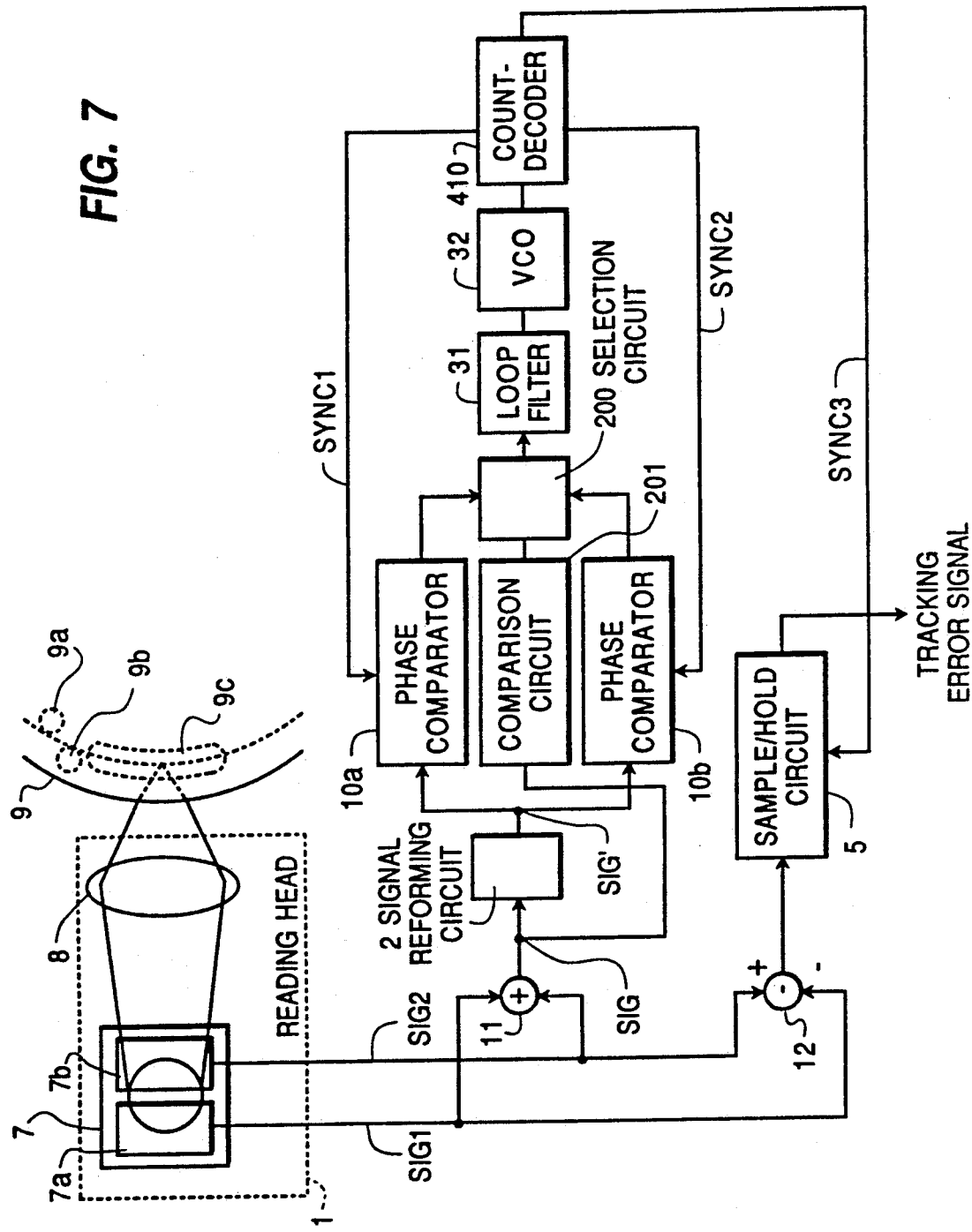
FIG. 7 is a block diagram showing a third embodiment of the invention.

The third embodiment of the present invention will now be described. In this embodiment, a method for optical tracking detection under the employment of the invention will be described. FIG. 7 shows a block diagram of the third embodiment of this invention and FIG. 8 shows a partial view of the record carrier for the third embodiment. The synchronizing marks 9a and 9b are formed in both sides of a track center line 910 similarly to those in FIG. 6. In addition, a track-guiding mark 9c for tracking error detection is formed on the track center line 910. Information data 93 are, of course, recorded along the track center line 910.

Furthermore in FIG. 7, a photo sensor 7, composed of elements 7a and 7b, is located in the light path of a back-coming light beam from the record carrier 9 in order to work as a reading head 1 with an objective lens 8. The record carrier 9 has been illuminated by a laser light beam in order for optical recording/reproducing. An add-amplifier 11 adds output signals of the elements 7a and 7b to each other in order to produce a read-out signal "SIG". The read-out signal "SIG" is reformed to a two-level signal "SIG'" by a signal reforming circuit 2. The reformed read-out signal "SIG'" is fed to a PLL composed of phase comparators 10a and 10b, a loop filter 31, a VCO 32, a count-decoder 410, a loop selection circuit 200 and a comparison circuit 201. The PLL works in the same manner as that in FIG. 1 except for the function of the count-decoder 410, which produces not only synchronizing signals "SYNC1" and "SYNC2" but also a synchronizing signal "SYNC3" for tracking detection.

Figure 9:
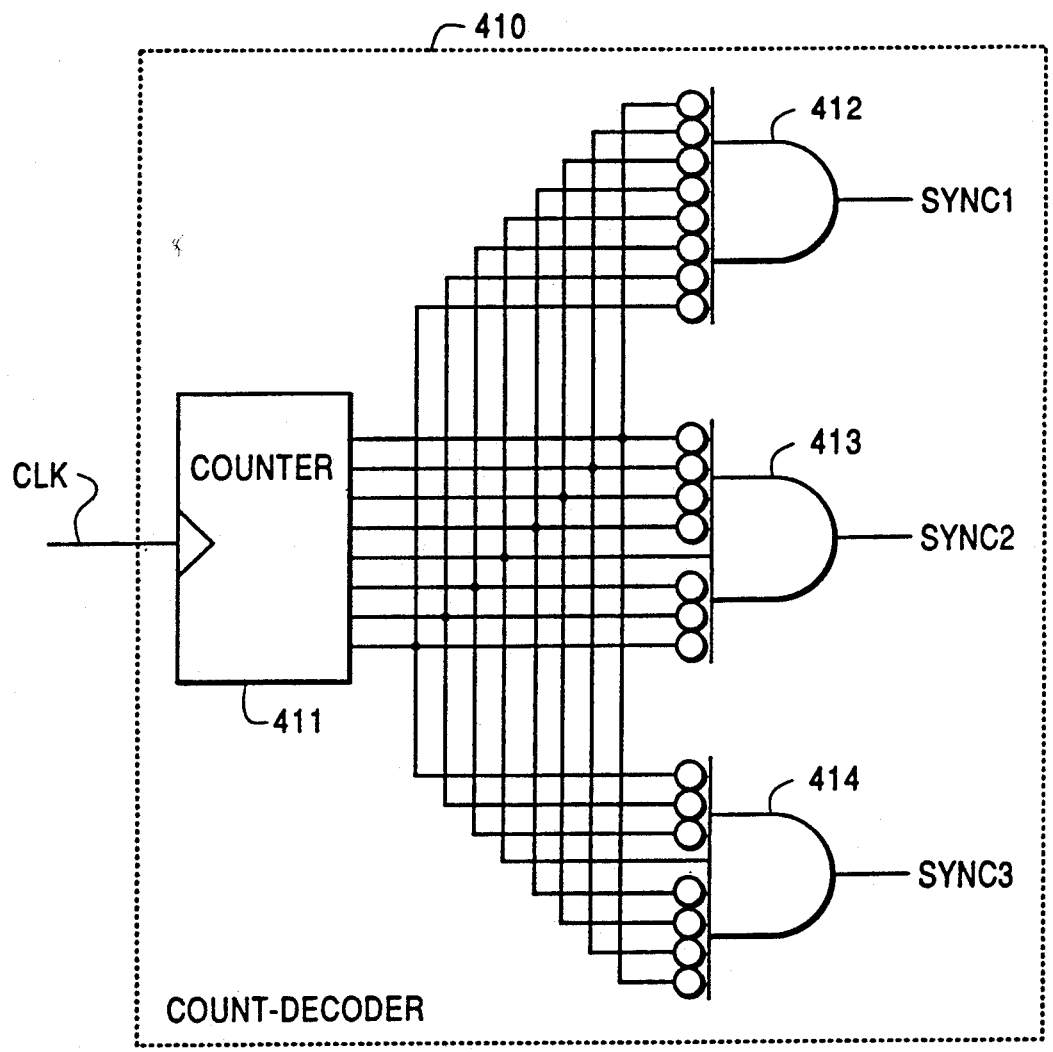
FIG. 9 is a block diagram of the count-decoder in FIG. 7.

FIG. 9 shows a circuit diagram of the count-decoder 410. The count decoder comprises a counter 411 and decoders 412, 413 and 414. The decoders 412 and 413 generates the synchronizing signals "SYNC1" and "SYNC2" respectively in response to digital code patterns produced by the counter 411. In addition, the decoder 414 generates the synchronizing signal "SYNC3", which will be explained later. In this embodiment, it is designed that the synchronizing signal "SYNC1" is generated when the decoder 412 receives 00000000 from 8-bit outputs of the counter 411, the synchronizing signal "SYNC2" when the decoder 413 receives 00001000 eight clocks after occurrence of the synchronizing signal "SYNC1", and the synchronizing signal "SYNC3" when the decoder 414 receives 00010000 sixteen clocks after the synchronizing signal "SYNC1".

A subtract-amplifier 12 produces a tracking error signal by subtracting the output of the photo sensor element 1b from the output of the element 1a. Thereafter, a sample/hold circuit 5 samples and holds the tracking error signal produced by the subtract-amplifier 12 at the timing of the synchronizing signal "SYNC3".

In a general description, a tracking error signal—a signal expressing the distance between the laser beam spot and the track center line—is derived from an image of the track being projected on a split photo sensor like the photo sensor 7. A gap between the elements 7a and 7b is located so as to divide the reflected laser beam in two in parallel direction to the track image. When the laser beam is just on the track center line, light power in each photo sensor element is equal. Therefore, the output of the tracking detection amplifier 4 is zero. When the laser beam is out of the track center line, light power in one element is larger or smaller than the other element. Thus, in the case, the tracking detection amplifier outputs plus or minus value. The technique for deriving a tracking error signal in the manner described above is well known as the push-pull method.

Figure 10:
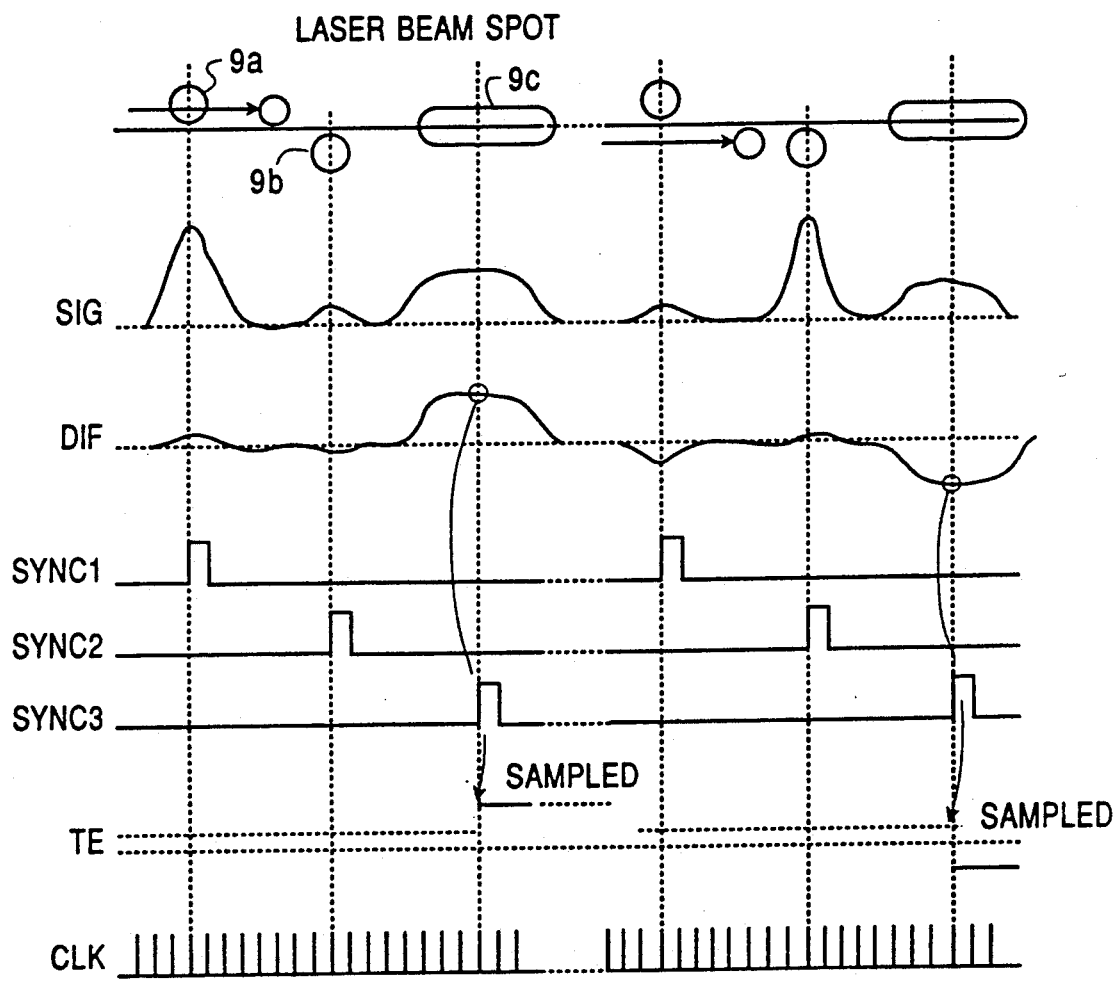
FIG. 10 is a timing chart of the block diagram shown in FIG. 7.

The sampling tracking-error detection, combined with this invention, makes a stubborn tracking servo system. The tracking error signal is sampled in the timing of the synchronizing signal "SYNC3" as shown in FIG. 10. Applying the prior art to the sampling tracking-error detection system, there occurs a problem that the tracking error signal disappears when the synchronizing mark is missing. According to the present invention, however, even if one of the synchronizing marks 9a and 9b fails to be detected, the synchronization is carried out with the other synchronizing mark.

Furthermore, the tracking-error detection with double synchronizing marks works effective in track-seek operation. As well known, the tracking error signal, in the track-seek, is utilized as a track-crossing signal for sensing the head position. When the reading head is moving from one track to another track, the current position of the reading head is estimated from the number of track-crossing signals having been detected from the beginning of the seek. In order to perform the track seek in accurate, the track-crossing signal should be detected without failure. Therefore, it is necessary that the tracking error signal is sampled whether or not the reading head is on the track or not. As described repeatedly, synchronization stability is independent of tracking position. The synchronizing signal "SYNC3" for tracking sampling, therefore, never vanishes while the synchronization is in operation.

Figure 11:
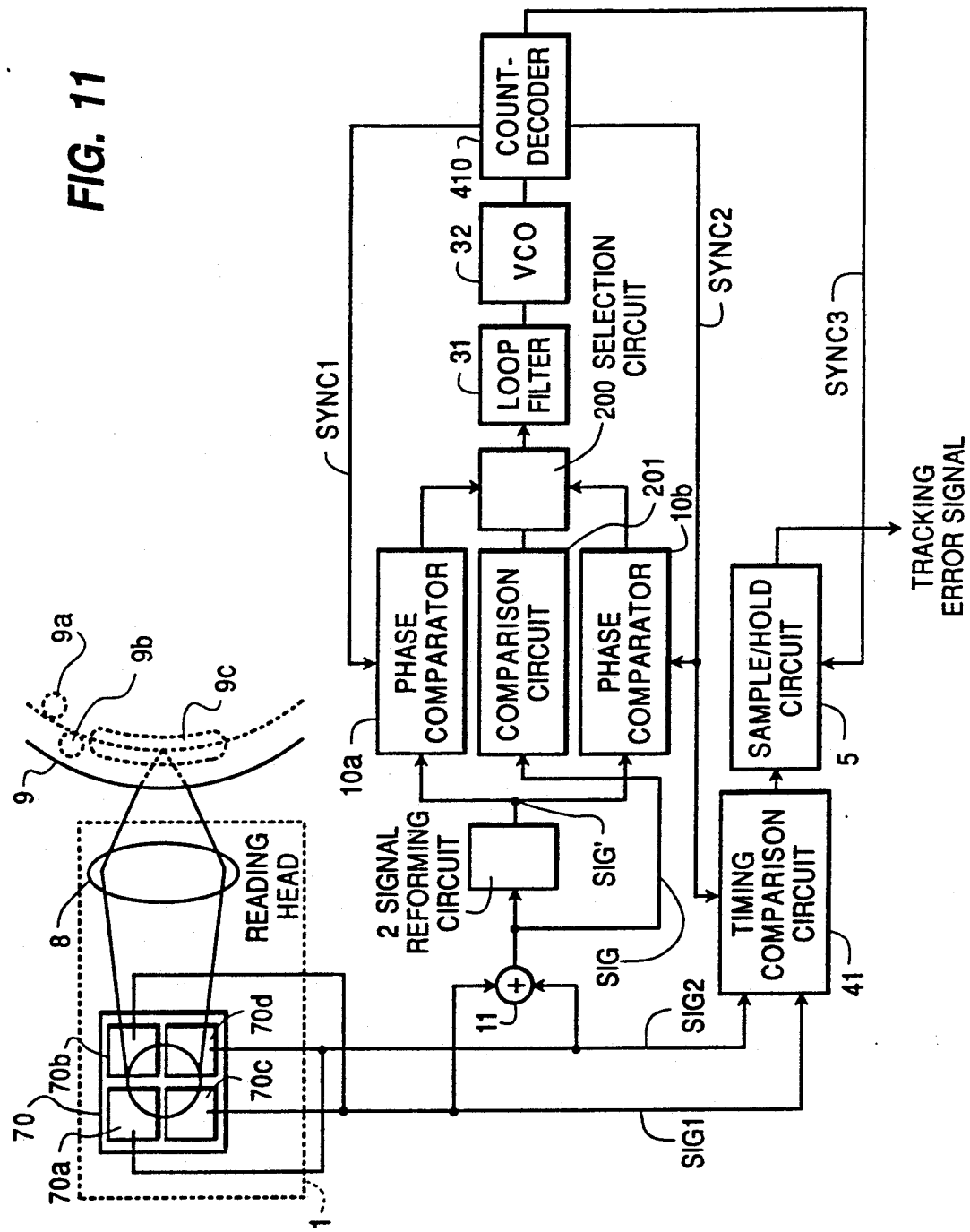
FIG. 11 is a block diagram of a fourth embodiment of the invention.
Figure 12:
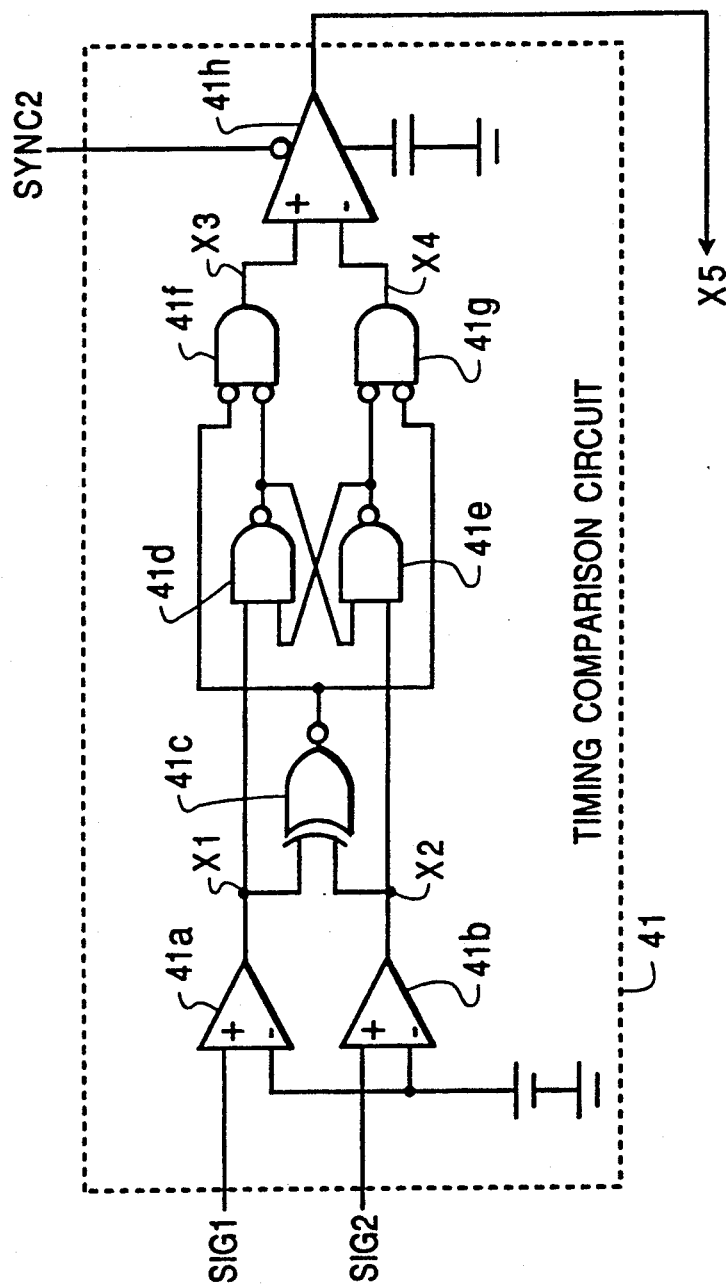
FIG. 12 is a block diagram of the timing comparator in FIG. 11.

There are other ways to get the tracking error signal beside the push-pull method being described above. More suitable tracking error detection technique will be shown as the fourth embodiment. FIG. 11 is a block diagram of the fourth embodiment. In FIG. 11, a signal reforming circuit 2, phase comparators 10a and 10b, a loop selection circuit 200, a comparison circuit 201, a loop filter 31, a VCO 32, a count-decoder 410 and a sample/hold circuit 5 are the same as those in the third embodiment shown in FIG. 7. It is characterized in this embodiment that a photo sensor 12 is divided to four elements 12a, 12b, 12c and 12d by perpendicularly crossing two lines and that two elements adjacent in orthogonal direction (elements 12a, 12c and elements 12b, 12d) are connected to each other for outputting read-out signals "SIG1" and "SIG2". Furthermore outputs of the two pairs of elements are fed to a timing comparison circuit 41, the detail of which is illustrated in FIG. 12. The output of the timing comparison circuit 41 is then sample-held as a tracking error signal in response to a synchronizing signal "SYNC3" generated by the count-decoder 410. The synchronizing signal "SYNC2" is fed to the timing comparison circuit 41 as a reset pulse. The read-out signal "SIG" for synchronizing detection is produced from the read-out signals "SIG1" and "SIG2" by an add-amplifier 11.

A similar technique for getting a tracking error signal from the timing error between outputs of a quad-divided detector has been disclosed in the U.S. Pat. No. 4,057,844. In this embodiment, an improved technique for a sample servo system is described. The technique is more advantageous than the push-pull method in applying for the sampling servo system. As described above, the synchronizing marks and the track-guiding mark is pre-formed on the record carrier. In general, they are formed in concave or convex domain relative to the recording surface. The depth or height of the marks determines the amplitude of the read-out signal. For example, the maximum read-out signal is derived from a mark whose depth (or height) is a quarter wave-length of the laser light beam. In the push-pull method, however, the tracking error signal cannot be derived from the mark of quarter-wave-length depth (or height). In order to get the push-pull tracking error signal in enough amplitude the depth of each tracking mark should be less than the quarter wavelength while the depth of each synchronizing mark is just the quarter wavelength. Such a complex structure will make a production cost very high.

On the other hand, the tracking error signal derived from the timing error between the output signals of the split photo sensor is independent of the mark depth (height) in principle. Therefore, both the read-out signal and the tracking error signal are derived from the quarter-wavelength marks. This means that all of pre-formed marks including the track guiding mark and the synchronizing marks are formed in unique depth or height, which will contribute to the cost reduction of a manufacturing process.

Figure 13:
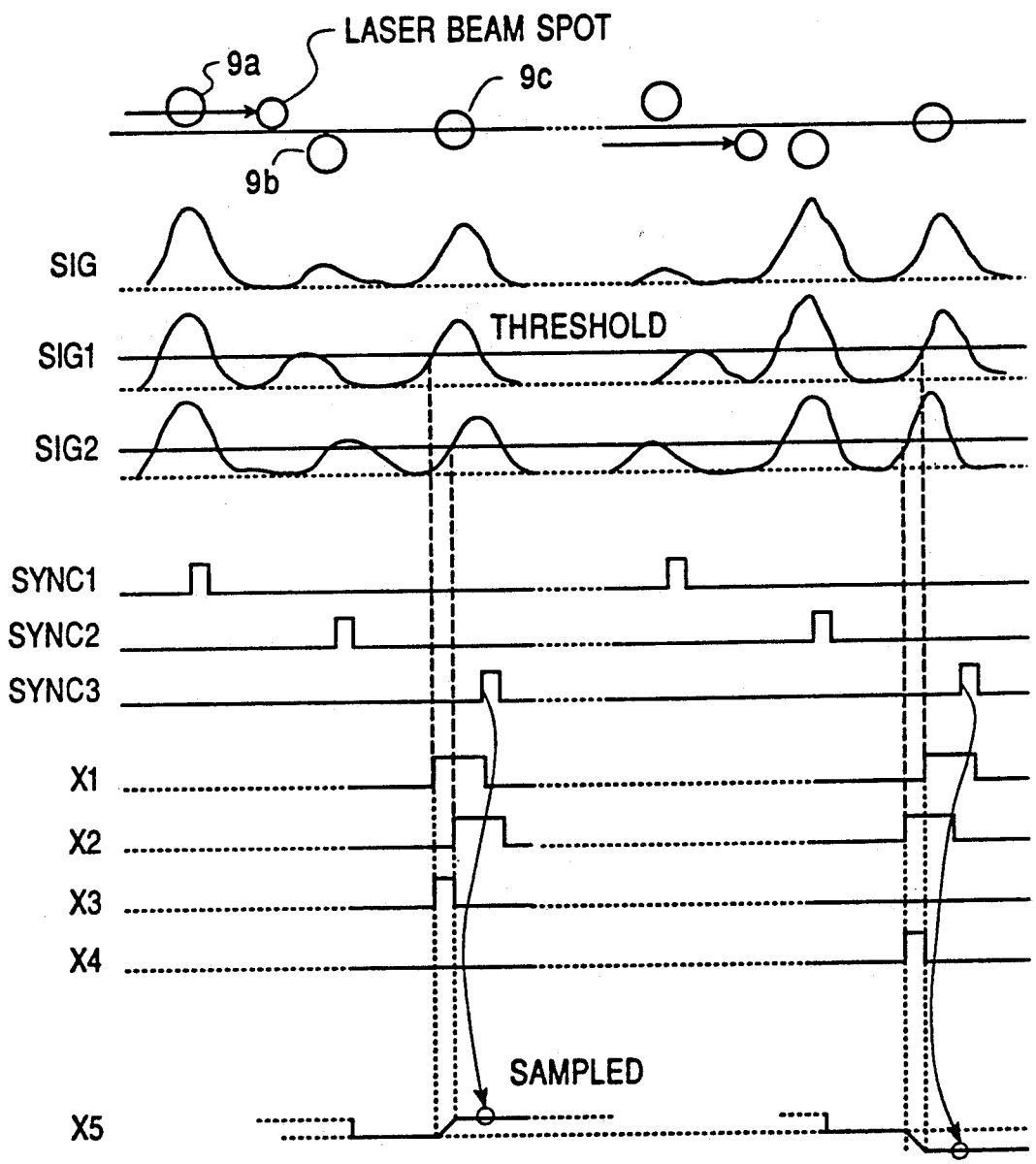
FIG. 13 is a timing chart of the block diagram shown in FIG. 11.

In this embodiment, the timing comparison circuit 41 is so designed as to convert the timing error to a voltage signal. FIG. 12 shows the circuit diagram of the timing comparison circuit 41, and FIG. 13 shows a timing chart of the circuit in FIG. 12. The read-out signals SIG1 and SIG2 are level-sliced by threshold comparators 41a and 41b to be two-level signals X1 and X2. The two level output signals "X1" and "X2" are then fed to a logic circuit composed of logic gates 41c, 41d, 41e, 41f and 41g. Final outputs "X3" and "X4" of the logic circuit vary differentially. That is, when the output "X1" rises faster than the output "X2", the output "X3" becomes high while the output "X4" remains low and when the output "X2" faster than the output "X1", the output "X4" becomes high and "X3" low. The pulse width is equal to the timing error between the outputs "X1" and "X2". By the way, a timing error between the outputs "X1" and "X2"—or the read-out signal "SIG1" and "SIG2", varies as a function of the tracking error as illustrated in FIG. 13. The outputs "X3" and "X4" are fed to a differential integral-amplifier 41h, which carries out integral operation as follows:

$$X5 = \int (X3 - X4) dt$$

The output "X5" is an analog output, which is sample/-held at rising/falling edges of the synchronizing signal "SYNC3". The integral-amplifier should have been reset in order to erase a result of a proceeding integral operation. Accordingly, the integral-amplifier 41h is reset by the synchronizing signal "SYNC2" occurring just before the tracking detection. The sample/held output "X5" is, of course, the desired tracing error signal.

What is claimed is:

1. An apparatus for deriving a synchronizing signal from groups of synchronizing marks pre-formed along information tracks on a record carrier, each of said groups having a plurality of synchronizing marks at least one of which is located adjacent a track center line on which information data are to be recorded, said apparatus comprising:

reading means for producing read-out signals sequentially from said synchronizing marks;

phase comparison means for producing a plurality of phase error signals from said read-out signals and synchronizing signals;

selection means for transmitting one of said phase error signals;

means for producing a clock signal as a function of said transmitted one of said phase error signals; and count-decoding means for producing said synchronizing signals from said clock signal.

2. An apparatus according to claim 1, wherein there exist delay means so that said phase error signals produced sequentially from said synchronizing marks are fed to said selection means simultaneously.

3. An apparatus according to claim 1, wherein said selection means transmits one of said phase error signals in response to amplitudes of said read-out signals.

4. An apparatus according to claim 1, wherein two synchronizing marks are formed in said group such that one of which is located on a track center line and the other of which is located adjacent said track center line.

5. An apparatus according to claim 1, wherein two synchronizing marks are formed in said group such that both of which are located adjacent said track center line in opposite sides of said track center line to each other.

6. An apparatus for deriving a synchronizing signal from groups of synchronizing marks pre-formed along information tracks on a record carrier, each of said groups having a plurality of synchronizing marks at least one of which is located out of a track center line on which information data are to be recorded and deriving a tracking error signal synchronously, said record carrier having also formed thereon track-guiding marks for indicating said track center line, said apparatus comprising:

optical reading means for producing read-out signals sequentially from said synchronizing marks and said track-guiding mark, comprising photo sensing means for converting light power to electric current, and an objective lens for projecting images of said synchronizing marks and track-guiding marks onto said photo sensing means, said photo sensing means comprising a plurality of sensor elements each of which outputting element signals, which are added to one another by an add-amplifier to produce said read-out signals;

phase comparison means for producing a plurality of phase error signals from said read-out signals and synchronizing signals;

selection means for transmitting one of said phase error signals;

means for producing a clock signal as a function of said transmitted one of said phase error signals;

tracking error signal producing means for deriving a tracking error signal from said element signals; and count-decoding means for producing said synchronizing signals from said clock signals, said count decoding means generating a timing signal from said clock signals for sampling said tracking error signal.

7. An apparatus according to claim 6, wherein two synchronizing marks are formed in said group such that both of which are located adjacent said track center line in opposite sides of said track center line to each other while said track guiding mark being located on said track center line.

8. An apparatus according to claim 6, wherein said tracking error signal producing means measures a timing difference among said sensor elements' output signals for producing said tracking error signal.

9. An apparatus according to claim 6, wherein said photo sensing means is intersected by two lines crossing to each other perpendicularly to make four sensor elements.

* * * * *